US012007103B1

(12) United States Patent
Gong

(10) Patent No.: US 12,007,103 B1
(45) Date of Patent: Jun. 11, 2024

(54) SWIMMING POOL LAMP

(71) Applicant: Shenzhen Zhifeng IoT Technology Co., Ltd., Shenzhen (CN)

(72) Inventor: Fei Gong, Shenzhen (CN)

(73) Assignee: Shenzhen Zhifeng IoT Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/358,843

(22) Filed: Jul. 25, 2023

(30) Foreign Application Priority Data

May 19, 2023 (CN) ........................ 202310571506.7

(51) Int. Cl.

| | |
|---|---|
| ***F21V 21/096*** | (2006.01) |
| ***F21S 9/03*** | (2006.01) |
| ***F21V 29/71*** | (2015.01) |
| ***F21V 31/00*** | (2006.01) |
| *F21W 131/401* | (2006.01) |
| *F21Y 105/18* | (2016.01) |
| *F21Y 115/10* | (2016.01) |

(52) U.S. Cl.

CPC ............ *F21V 21/096* (2013.01); *F21S 9/032* (2013.01); *F21V 29/717* (2015.01); *F21V 31/005* (2013.01); *F21W 2131/401* (2013.01); *F21Y 2105/18* (2016.08); *F21Y 2115/10* (2016.08)

(58) Field of Classification Search

CPC .... F21V 31/005; F21V 29/717; F21V 21/096; F21S 9/032

See application file for complete search history.

(56) References Cited

U.S. PATENT DOCUMENTS

| | | | | |
|---|---|---|---|---|
| 7,396,139 B2 * | 7/2008 | Savage | F21V 31/005 | 362/267 |
| 11,555,607 B1 * | 1/2023 | Wei | F21V 5/007 | |
| 2005/0248944 A1 * | 11/2005 | Sloan | H05B 45/46 | 362/234 |
| 2018/0084625 A1 * | 3/2018 | Niebert | H05B 47/18 | |
| 2022/0341554 A1 * | 10/2022 | Xu | F21S 9/037 | |
| 2023/0243497 A1 * | 8/2023 | Duran | F21V 31/005 | 362/249.02 |
| 2023/0324037 A1 * | 10/2023 | Zhang | H04R 1/028 | 362/296.01 |

FOREIGN PATENT DOCUMENTS

| | | |
|---|---|---|
| CN | 216521130 U | 5/2022 |
| CN | 217546371 U | 10/2022 |
| CN | 218095620 U | 12/2022 |

* cited by examiner

*Primary Examiner* — Christopher E Dunay
(74) *Attorney, Agent, or Firm* — Nitin Kaushik

(57) ABSTRACT

The present invention discloses a swimming pool lamp, comprising: a light-emitting lamp body and a controller, wherein the light-emitting lamp body comprises a mounting substrate and several RGBIC lamp beads installed on the mounting substrate; One end of the controller is electrically connected to the light-emitting lamp body, and the other end is connected to the power supply device through a power cord to supply power to the light-emitting lamp body; wherein, any RGBIC lamp bead comprises several light-emitting chips and a programmable driving IC electrically connected to the light-emitting chip. The swimming pool lamp provided by the present invention is connected to a controller through a light-emitting lamp body, and multiple lighting modes are switched and controlled through several RGBIC lamp beads in the light-emitting lamp body.

9 Claims, 9 Drawing Sheets

SWIMMING POOL LAMP

CROSS-REFERENCE TO RELATED APPLICATIONS

The application claims priority to Chinese patent application No. 2023105715067, filed on May 19, 2023, the entire contents of which are incorporated herein by reference.

TECHNICAL FIELD

The present invention relates to the technical field of swimming pool decorations, in particular to a swimming pool lamp.

BACKGROUND

A swimming pool is a specialized place for people to engage in swimming or water entertainment, where they can engage in activities or competitions. Due to busy work or studies, people not only swim during the day, but also often at night. In order to increase the interest of the swimming scene, relevant lighting devices to increase the atmosphere of the swimming pool have been developed. There are already technical solutions in existing lighting devices that can achieve multiple lighting effects, but these lights usually only have a few simple lighting effects, and the interest will be greatly reduced after they are used for a long time and people are familiar with the lighting effects.

The Chinese Patent Application with Publication Number CN217546371U discloses a wireless control system for swimming pool lamps, which comprises an assembly control box connected to several transformers through wires; Each transformer is connected to several swimming pool lamps through wires; The assembly control box comprises an internal main control module; One side of the main control module is integrated with wireless components, and the other side is conductively connected to a control panel; There is a terminal block below the main control module; There are several relays in the terminal block; The swimming pool lamps comprise a color changing light board, which is integrated with color changing modules. The invention provides a technical solution that can achieve color switching of swimming pool lamps and solve the problem of single function in the existing swimming pool lamp control system by using a combination of multiple color changing modules, transformers, relays and several swimming pool lamps. However, this technical solution requires the connection and coordination of multiple relays, multiple different transformers, and multiple swimming pool lamps of different models or brightness to achieve multiple lighting modes and switch control effects. The implementation of its technical effect relies on the interconnection and control of multiple electrical components, which not only has high production and transportation costs, but also requires a large space for installation and usage in practical applications.

For this reason, developing a swimming pool lamp that is small in size, convenient in use and capable of achieving various lighting effects is currently a problem that needs to be solved.

SUMMARY

The purpose of the present invention is to provide a swimming pool lamp that is small in size, convenient in use and capable of achieving various lighting effects, in response to the aforementioned problems existing in existing swimming pool lamps.

In order to solve the above technical problems, the present invention is implemented through the following technical solutions:

A swimming pool lamp, comprising:

A light-emitting lamp body, comprising amounting substrate and several RGBIC lamp beads installed on the mounting substrate;

A controller, one end of which is electrically connected to the light-emitting lamp body, and the other end is connected to a power supply device through a power cord to supply power to the light-emitting lamp body;

Wherein, any RGBIC lamp bead comprises several light-emitting chips and a programmable driving IC electrically connected to the light-emitting chips.

In one embodiment, it further comprises a holder for fixedly connecting the light-emitting lamp body to the swimming pool.

In one embodiment, the holder comprises a first mounting portion detachably connected to the light-emitting lamp body and a second mounting portion that is away from the first mounting portion and fixedly connected to the swimming pool; The first mounting portion can be detachably connected to the backlight side of the light-emitting lamp body, and the second mounting portion is fixed to the pool wall or bottom to fix the light-emitting lamp body to the pool wall or bottom.

In one embodiment, the light-emitting lamp body comprises a first housing, a second housing, and a light-transmitting housing. The light-transmitting housing and the first housing are fixedly connected to the second housing, respectively, and the light-transmitting housing, the second housing and the first housing are jointly enclosed to form a space for containing the mounting substrate and several RGBIC lamp beads; The connections between the second housing and the light-transmitting housing as well as the first housing are respectively provided with a first waterproof structure and a second waterproof structure.

In one embodiment, both the first waterproof structure and the second waterproof structure comprise an annular flange protruding from the connections between the second housing and the light-transmitting housing as well as the first housing, an annular groove concaving at the light-transmitting housing and the connection between the first housing and the second housing, and an elastic waterproof member embedded between the annular flange and the annular groove.

In one embodiment, both the first waterproof structure and the second waterproof structure are provided with at least two sets, the at least two sets of first waterproof structures are arranged coaxially, and the at least two sets of second waterproof structures are arranged coaxially.

In one embodiment, it further comprises a heat sink, which is attached to the back of the mounting substrate, where several RGBIC lamp beads are installed on the back. In one embodiment, the heat sink comprises a heat conduction portion and a fin structure, wherein the heat conduction portion is attached to the mounting substrate, the heat-sink-fin structure comprises a first heat dissipation portion connected to the heat conduction portion and extending away from the mounting substrate, and a second heat dissipation portion formed by extending the first heat dissipation portion away from the end of the heat conduction portion, the second heat dissipation portion is in contact with the inner surface of the second housing towards the containment space.

In one embodiment, it further comprises a solar energy storage device electrically connected to the controller, which is used to convert solar energy into electrical energy and store it to power the light-emitting lamp body.

In one embodiment, the solar energy storage device comprises a photovoltaic panel, an energy storage component electrically connected to the photovoltaic panel, and a fixed base. The photovoltaic panel is rotatably arranged at the top of the energy storage component, and the fixed base is fixedly arranged at the bottom of the energy storage component;

The energy storage component is arranged in a columnar structure, and the fixed base comprises a connection portion for connecting with the energy storage component and a supporting chassis fixedly connected at the bottom of the connection portion; The connection portion has an accommodating cavity that is suitable for the bottom of the energy storage component, and the energy storage component can be fixed in the accommodating cavity in a plug-in manner.

In one embodiment, the solar energy storage device comprises a photovoltaic panel, an energy storage component electrically connected to the photovoltaic panel, and a clamping base. The photovoltaic panel is rotatably arranged at the top of the energy storage component, and the clamping base is fixedly arranged at the bottom of the energy storage component; The clamping base comprises a fixing portion fixedly connected to the energy storage component, a clamping frame fixedly connected to the fixing portion and forming a clamping space, and an adjusting element connected to the clamping frame and used to adjust the size of the clamping space.

Compared to prior art, the beneficial effects of the present invention lie in:

The swimming pool lamp provided by the present invention is connected to a controller through a light-emitting lamp body, and multiple lighting modes are switched and controlled through several RGBIC lamp beads in the light-emitting lamp body. Through a programmable driving IC, several light-emitting chips are controlled according to a preset program to combine multiple lighting effects; It requires fewer components and is small in size, effectively reducing the production and transportation costs caused by the need for multiple components to connect and work with existing swimming pool light technology, as well as reducing the space required for actual installation and use.

BRIEF DESCRIPTION OF DRAWINGS

To more clearly illustrate the embodiments of the present invention or the technical solutions in the prior art, a brief description of the drawings required to be used in the embodiments or in the description of the prior art is presented below. It is obvious that the drawings described below are only some embodiments of the present invention, and that other drawings may be obtained based on the structures shown in these drawings without any creative effort on the part of the ordinary technician in the field.

Figure 1:
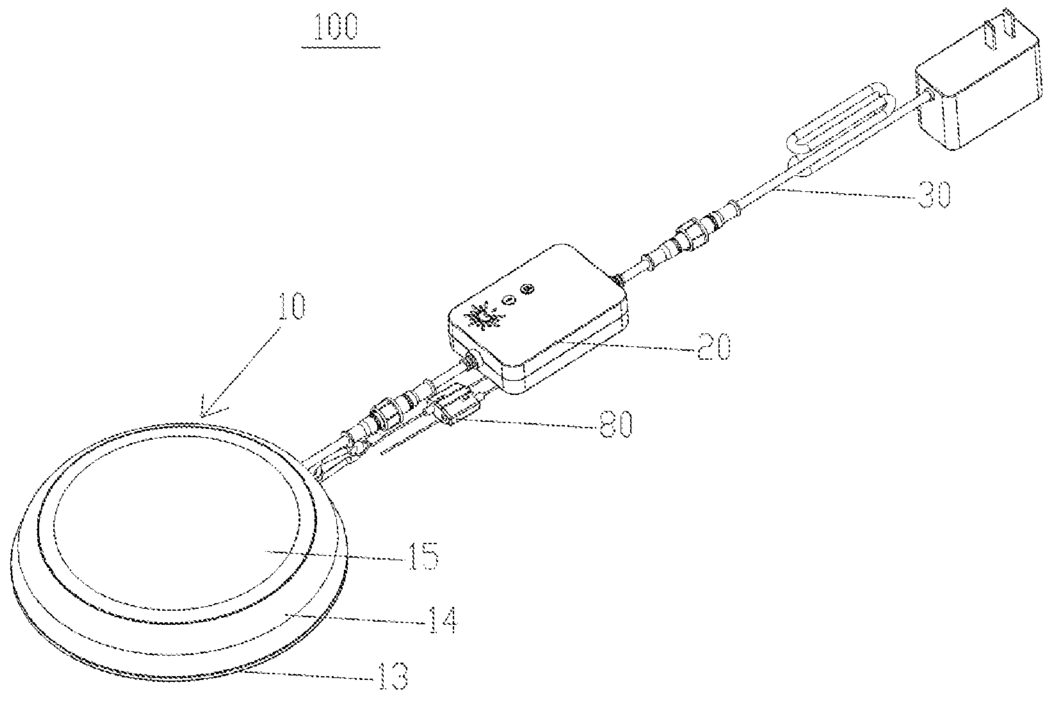
FIG. 1 shows a schematic diagram of the overall structure of the swimming pool lamp in the embodiment of the present invention.

Key in the figure: 100. Swimming pool lamp; 10. Light-emitting lamp body; 11. Mounting substrate; 12. RGBIC lamp beads; 20. Controller; 30. Power cord; 40. Holder; 41. First mounting portion; 42. Second mounting portion; 401. Snap slot; 402. Snap fastener; 403. First magnetic component; 404. Second magnetic component; 421. Annular pattern; 13. First housing; 14. Second housing; 15. Light-transmitting housing; 51. First waterproof structure; 52. Second waterproof structure; 500. Annular flange; 501. Annular groove; 60. Heat sink; 61. Heat conduction portion; 62. Fin structure; 621. First heat dissipation portion; 622. Second heat dissipation portion; 6221. Fin structure; 6222. Abutting part; 70. Solar energy storage device; 71. Photovoltaic panel; 72. Energy storage component; 73. Fixed base; 731. Connection portion; 732. Supporting chassis; 730. Accommodating cavity; 74. Clamping base; 741. Fixing portion; 742. Clamping frame; 743. Adjusting element; 80. Hanging rope.

DETAILED DESCRIPTION OF THE EMBODIMENTS

In order to make the above purposes, features and advantages of this application more obvious and understandable, the following will provide further detailed explanations of this application in conjunction with the accompanying drawings and specific implementation methods.

In the description of this application, it should be understood that the terms "middle", "top", "bottom", "inside", "outside", etc. indicate the orientation or position relationship based on the orientation or position relationship shown in the accompanying drawings, only for the convenience of describing this application and simplifying the description, rather than indicating or implying that the device or element referred to must have a specific orientation, be constructed and operated in a specific orientation, therefore, it cannot be understood as a limitation on this application. The terms "first" and "second" are used for descriptive purposes only and are not to be construed as indicating or implying relative importance or implicitly specifying the quantity of technical features indicated. Thus, the features qualified with "first" and "second" may explicitly or implicitly include one or more of these features. In the description of this application, "multiple" refers to two or more, unless otherwise specified.

In addition, unless otherwise specified and limited, the terms "install/installation", "attach/attachment", "connect/connection", "fix/fixation" and other terms should be broadly understood, for example, it may be fixedly connected/fixed connection, detachably connected/detachable connection, or integrally connected/integrated connection; It may be mechanically connected/mechanical connection or electrically connected/electrical connection; It may be directly connectedly/direct connection, or indirectly connected/indirect connection through an intermediate medium, or it may be internally connected/internal connection between two components. For ordinary technical personnel in this field, the specific meanings of the above terms in this application can be understood based on specific circumstances.

In this application, unless otherwise explicitly specified and limited, if the first feature is "above" or "below" the second feature, it may include direct contact between the first and second features, or contact between the first and second features through other features between them instead of direct contact. Moreover, if the first feature is "on", "above", and "overhead" the second feature, it includes the first feature directly above and diagonally above the second feature, or simply indicates that the horizontal height of the first feature is more than that of the second feature. If the first feature is "under", "below", and "underneath" the second feature, it includes the first feature directly below and diagonally below the second feature, or simply indicates that the horizontal height of the first feature is less than that of the second feature.

Embodiment: Referring to FIGS. 1-9, the present invention provides a swimming pool lamp 100 for the existing swimming pool lamp 100 which relies on multiple components to be connected in order to achieve a variety of lighting effects, which has the problems of large space occupation, inconvenient installation and use, and high production and transportation costs.

Figure 2:
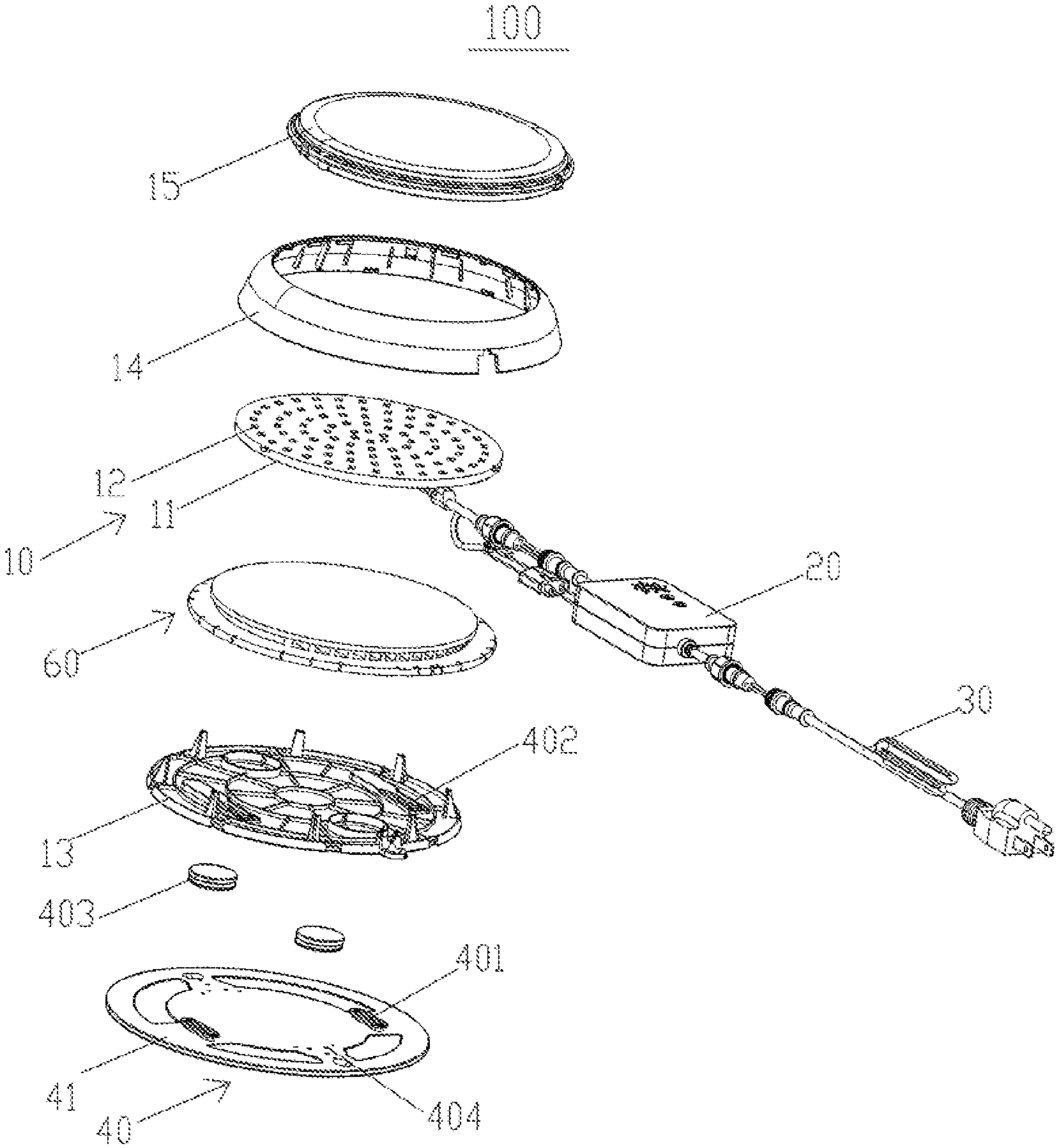
FIG. 2 shows an exploded view of the swimming pool lamp in the embodiment of the present invention.

Referring to FIGS. 1 to 2, the swimming pool lamp 100 comprises a light-emitting lamp body 10 and a controller 20, wherein the light-emitting lamp body 10 comprises a mounting substrate 11 and several RGBIC lamp beads 12 installed on the mounting substrate 11; One end of the controller 20 is electrically connected to the light-emitting lamp body 10, and the other end is connected to the power supply device through a power cord 30 to supply power to the light-emitting lamp body 10; wherein, any of the RGBIC lamp beads 12 comprises several light-emitting chips and a programmable driving IC electrically connected to the light-emitting chip, which is used to control the luminescence of the light-emitting chip according to a preset program.

The swimming pool lamp 100 provided by the present invention is connected to a controller 20 through a light-emitting lamp body 10, and multiple lighting modes are switched and controlled through several RGBIC lamp beads in the light-emitting lamp body. Through a programmable driving IC, several light-emitting chips are controlled according to a preset program to combine multiple lighting effects; It requires fewer components and is small in size, effectively reducing the production and transportation costs caused by the need for multiple components to connect and work with existing pool light technology, as well as reducing the space required for actual installation and use.

Exemplarily, the swimming pool lamp 100 is equipped with an application program (hereinafter referred to as the APP) that can run on mobile terminal devices such as mobile phones and tablet computers. Users can log in to the APP through the aforementioned mobile terminal devices and control the swimming pool lamp 100 through the APP, such as on/off, lighting effect switching, and lighting mode customization. Understandably, the lighting effect switching referred to in this embodiment not only refers to the user's ability to choose from several preset lighting effects on the APP, such as soft, bright, dance, racing, and other lighting effects in various scenarios; It also includes user defined lighting effect switching, which is selected and combined by the user based on the basic options preset in the APP, and formed by setting specific parameters. The hardware implementation includes but is not limited to wireless communication module transmission (the APP sends control instructions to the swimming pool lamp 100), driving IC connection with each light-emitting chip (controlling the brightness and current intensity of each light-emitting chip through the driving IC), and several RGBIC lamp beads 12 in series and/or parallel connection.

Figure 5:
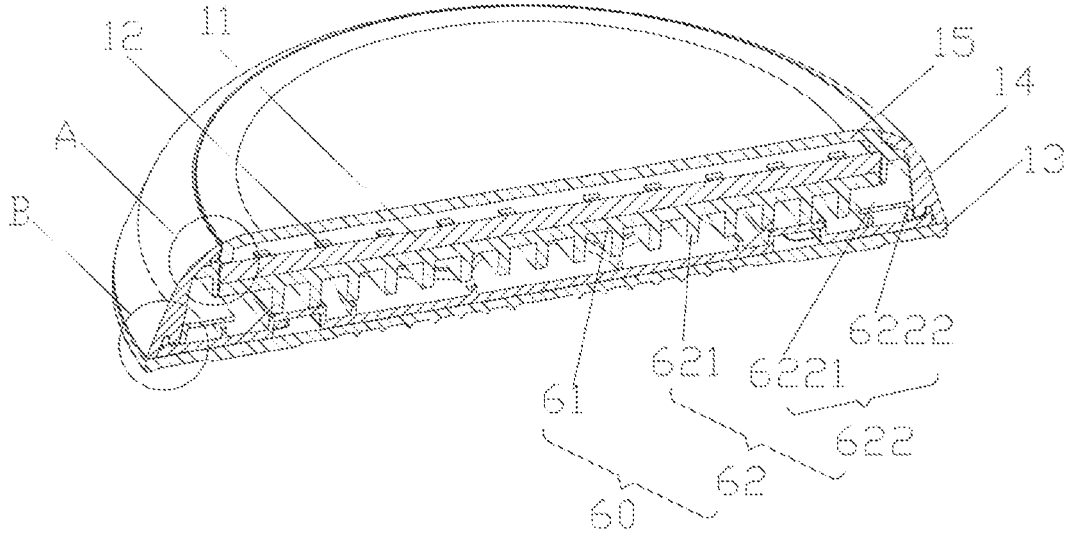
FIG. 5 shows a cross-sectional schematic diagram of one angle of the light-emitting lamp body in the embodiment of the present invention.

As shown in FIGS. 2 and 5, in this embodiment, the mounting substrate 11 is set to be circular, and several RGBIC lamp beads 12 are evenly distributed on the mounting substrate 11. In other embodiments, the mounting substrate 11 may also be set to other shapes, and several RGBIC lamp beads 12 may also be designed into other arrangement forms based on the shape or certain patterns of the mounting substrate 11. As one of the embodiments, any of the RGBIC lamp beads 12 is equipped with a unique code. Users can control any of RGBIC lamp beads 12 through the APP to combine the most lighting effects and achieve maximum lighting effect control. Understandably, the maximum lighting effect control herein refers to the user being able to select and control the lighting mode of any light-emitting chip in any RGBIC lamp bead 12, that is, maximizing the degree of freedom for users to control lighting effects.

As shown in FIGS. 1-7, in one embodiment, the swimming pool lamp 100 further comprise a holder 40 for fixedly connecting the light-emitting lamp body 10 to the swimming pool. Fix the swimming pool lamp 100 to the bottom, wall, and other positions of the pool through the holder 40, so as to prevent the swimming pool lamp 100 from shifting due to water flow or collision with swimmers, and further avoid safety accidents such as related power cord 30 pulling, leakage, and entanglement with swimmers caused by displacement; Moreover, fixing the swimming pool lamp 100 can also ensure that the lighting effect is implemented according to the user's intention. For example, users can achieve specific lighting effects by fixing the swimming pool lamp 100 at a specific position in the pool, which includes but is not limited to the lighting effect achieved by combining several swimming pool lamps 100 fixed in different positions.

Figure 3:
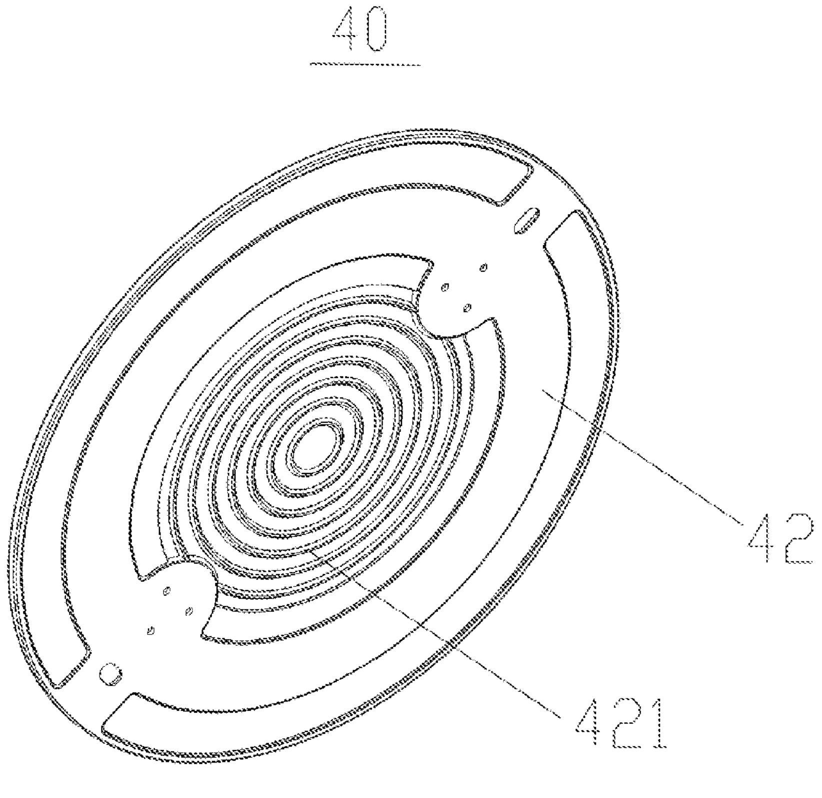
FIG. 3 shows a structural schematic diagram of one angle of the holder in the embodiment of the present invention.

As shown in FIGS. 2 and 3, in one embodiment, the holder 40 comprises a first mounting portion 41 detachably connected to the light-emitting lamp body 10 and a second mounting portion 42 that is away from the first mounting portion 41 and fixedly connected to the swimming pool; The first mounting portion 41 can be detachably connected to the backlight side of the light-emitting lamp body 10, and the second mounting portion 42 is fixed to the pool wall or bottom to fix the light-emitting lamp body 10 to the pool wall or bottom.

Setting the first mounting portion 41 that can be detachably connected to the light-emitting lamp body 10 and the second mounting portion 42 that is located on the back of the first mounting portion 41 and fixedly connected to the swimming pool, the light-emitting lamp body 10 in the swimming pool lamp 100 provided in this embodiment can be detachably connected to the swimming pool through the holder 40 makes it convenient for users to disassemble the light-emitting lamp body 10 in winter or when cleaning the swimming pool without the need for the swimming pool lamp 100, to protect the light-emitting lamp body 10 partially from natural erosion such as wind, sun, rain, etc., or to avoid potential impacts when cleaning the swimming pool, thereby extending its service life.

Furthermore, it is possible to purchase only one light-emitting lamp body 10 but also a plurality of the holders 40 at the same time, and fix the plurality of the holders 40 at multiple locations in the swimming pool to achieve the purpose of using one light-emitting lamp body 10 at multiple locations, which improves the efficiency of swimming pool lamp 100 and avoids idleness.

As shown in FIGS. 1-7, exemplarily, the holder 40 is an integrated plate-like structure, which in this embodiment is set as a circular thin plate shape, but in other embodiments, its outer edge shape can be adjusted according to factors such as the shape or aesthetics of the light-emitting lamp body 10.

As shown in FIGS. 2-7, the first mounting portion 41 and the second mounting portion 42 are respectively the positive and negative surfaces of the circular thin plate. In one example, the first mounting portion 41 is equipped with a snap slot 401, and the backlight side of the light-emitting lamp body 10 corresponds to the snap slot 401 with a snap fastener 402. The light-emitting lamp body 10 is connected to the first mounting portion 41 through the snap fastener 402 in conjunction with the snap slot 401. Exemplarily, the backlight side of the light-emitting lamp body 10 is embedded with a first magnetic component 403, and the holder 40 is equipped with a second magnetic component 404 corresponding to the first magnetic component 403. The light-emitting lamp body 10 and the holder 40 are magnetically fixed by the first magnetic component 403 and the second magnetic component 404. Optionally, both snap and magnetic connections can be used, which means that the snap fastener 402, the snap slot 401, the first magnetic component 403 and the second magnetic component 404 can be simultaneously installed in a swimming pool lamp 100 to improve the connection strength between the light-emitting lamp body 10 and the holder 40 and enrich the application scenarios of the swimming pool lamp 100. If the swimming pool lamp 100 is used in a traditional underground swimming pool, both the snap and magnetic connections are applicable. However, when the swimming pool lamp 100 is used in a cloth enclosed swimming pool, the light-emitting lamp body 10 and the holder 40 can be magnetically fixed on both sides of the cloth through the first magnetic component 403 and the second magnetic component 404.

As shown in FIG. 3, as one example, the second mounting portion 42 is equipped with an annular pattern 421 for filling waterproof adhesive on the surface of the fixed connection with the swimming pool. When fixing the holder 40 with the pool wall or bottom, the waterproof adhesive can be directly applied to the annular pattern 421 and the second mounting portion 42 is facing the desired fixed surface, applying a certain amount of pressure to it. After the waterproof adhesive dries out, the holder 40 is fixedly connected with the pool wall or bottom, and when the swimming pool lamp 100 needs to be used, the light-emitting lamp body 10 can be fixed to the holder 40 through snap connection or magnetic connection. By setting the annular raised pattern 421, the holder 40 can be easily fixed in the swimming pool by means of waterproof adhesive, which is simple to fix while also reduces the installation space.

Referring to FIG. 3, in one embodiment, the annular pattern 421 comprises a plurality of annular patterns 421 with different inner diameters and concentric settings, and a groove is formed between the adjacent two of the plurality of annular patterns 421 for filling the waterproof adhesive. Each of the plurality of annular patterns 421 can be set at the center of the second mounting portion 42 or cover the surface of the second mounting portion 42.

In other embodiments, the annular pattern 421 can also be set as a pattern structure protruding from the surface of the second mounting portion 42 to accommodate a certain amount of waterproof adhesive, so that the second mounting portion 42 and the target surface that needs to be fixed can be covered with a certain thickness of waterproof adhesive, and the two can be fixedly connected through waterproof adhesive.

As shown in FIGS. 1 and 2, furthermore, a hanging rope 80 can be connected to the light-emitting lamp body 10, and the light-emitting lamp body 10 can be hung on other fixed objects through the hanging rope 80.

Understandably, in this embodiment, when the light-emitting lamp body 10 is fixed to the wall or bottom of the swimming pool through the holder 40, its luminous side faces towards the interior of the swimming pool, so that when the swimming pool lamp 100 is working, its light can pass through the water wave and further combine with the water wave to produce light effects such as flickering waves.

Referring to FIGS. 1 to 7, in one embodiment, the light-emitting lamp body 10 comprises a first housing 13, a second housing 14, and a light-transmitting housing 15. The light-transmitting housing 15 and the first housing 13 are fixedly connected to the second housing 14, respectively. The light-transmitting housing 15, the second housing 14, and the first housing 13 are jointly enclosed to form a space for containing the mounting substrate 11 and several RGBIC lamp beads 12; The connections between the second housing 14, the light-transmitting housing 15 and the first housing 13 are respectively equipped with a first waterproof structure 51 and a second waterproof structure 52. Exemplarily, the first housing 13, the second housing 14 and the light-transmitting housing 15 can be fixedly connected through buckles or screws. The first waterproof structure 51 and the second waterproof structure 52 ensure the sealing of the containment space formed by the first housing 13, the second housing 14 and the light-transmitting housing 15, to prevent internal components from water ingress, short circuit, or even leakage accidents.

Figure 6:
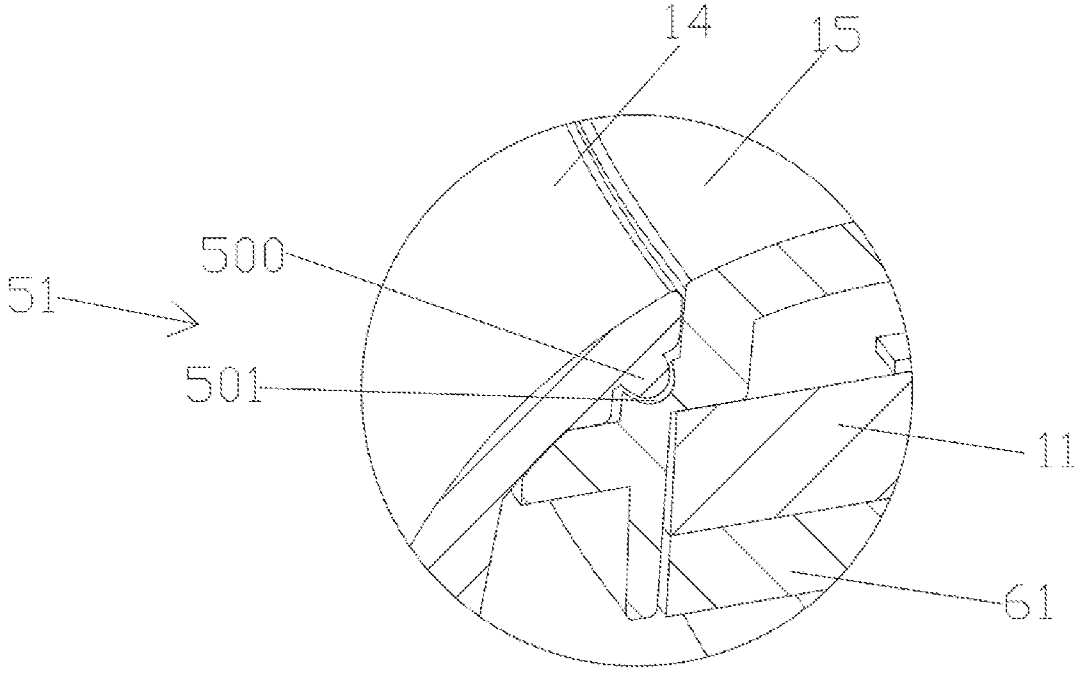
FIG. 6 shows a partially enlarged view of Ain FIG. 5.
Figure 7:
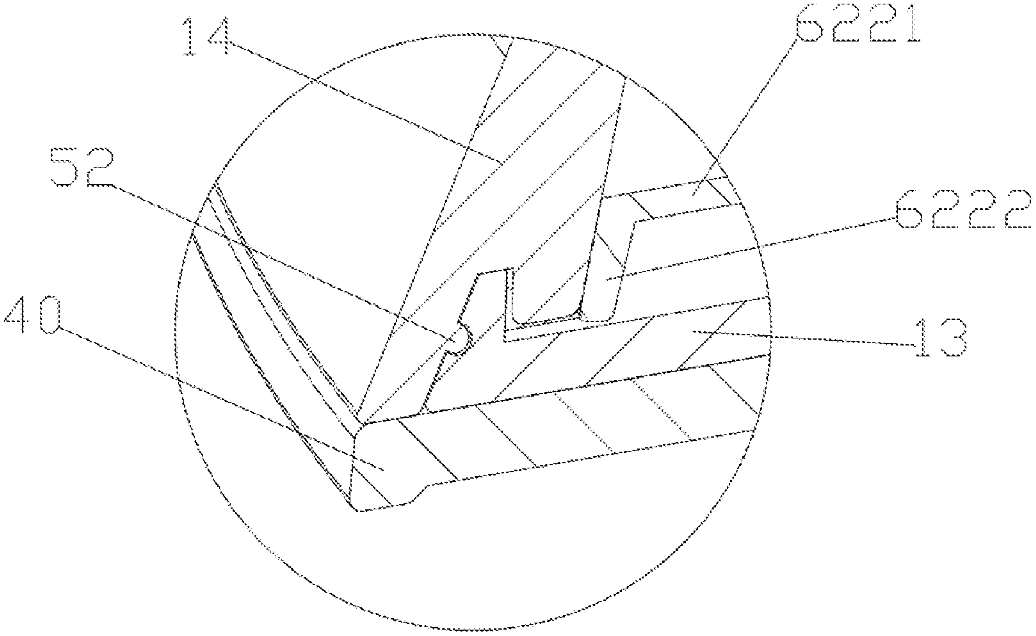
FIG. 7 shows a partially enlarged view of B in FIG. 5.

Referring to FIGS. 5-7, in one embodiment, both the first waterproof structure 51 and the second waterproof structure 52 comprise an annular flange 500 protruding from the connections between the second housing 14 and the light-transmitting housing 15 as well as the first housing 12, an annular groove 501 concaving at the light-transmitting housing 15 and the connection between the first housing 13 and the second housing 14, and an elastic waterproof member embedded between the annular flange 500 and the annular groove 501. When the second housing 14 is fixed with the light-transmitting housing 15, and the second housing 14 is fixed with the first housing 13, the annular flange 500 in the first waterproof structure 51 and the second waterproof structure 52 abuts the elastic waterproof member and is embedded in the annular groove 501, that is, an elastic waterproof member is clamped and fixed between the outer wall of the annular flange 500 and the inner wall of the annular groove 501, and the combination of the three forms a structure similar to a waterproof wall, it can effectively ensure the sealing of the internal containment space.

Referring to FIGS. 5-7, exemplarily, the elastic waterproof member can be made of materials with certain elasticity such as silicone or rubber, and its shape can be set to be a soft structure that fits with the outer surface of the annular flange 500 and has a certain thickness. The outer shape of the annular flange 500 is compatible with the annular groove 501, but its size is slightly smaller than the annular groove 501 to accommodate the elastic waterproof member. When installing, first wrap the elastic waterproof member around the annular flange 500, and then apply a certain force to the annular flange 500 that is wrapped with the elastic waterproof member to embed it into the annular groove 501, so that the annular flange 500 and the annular groove 501 form an interference fit through the elastic waterproof member. In one embodiment, the elastic waterproof member is set as an elastic cover, which is wrapped around the outer circumference of the annular flange 500 or fixed on the inner circumference of the annular groove 501.

In another embodiment, the elastic waterproof member may also be replaced by waterproof sealant, that is, a certain amount of waterproof sealant is first applied to the outer surface of the annular flange 500 and the inner surface of the annular groove 501 during installation. During assembly, the annular flange 500 is embedded in the annular groove 501, and the sealing effect can be formed after the waterproof sealant solidifies. Understandably, in this method, the waterproof sealant can be excessive to fill the gap between the annular flange 500 and the annular groove 501.

In one embodiment, both the first waterproof structure 51 and the second waterproof structure 52 are provided with at least two sets, with at least two sets of first waterproof structures 51 having different inner diameters and being coaxial, and at least two sets of second waterproof structures 52 having different inner diameters and being coaxial, that is, at least two sets of waterproof structures 51 with smaller inner diameters are located on the inner circumference of another waterproof structure and adjacent to it, and at least two sets of second waterproof structures 52 are also set in the same way. In other embodiments, the waterproof structure may also be set to other quantities, and the spacing distance between adjacent waterproof structures may be further set. adjacent waterproof structures may also be further set with elastic waterproof members or filled with waterproof sealant to improve the waterproof effect.

Figure 4:
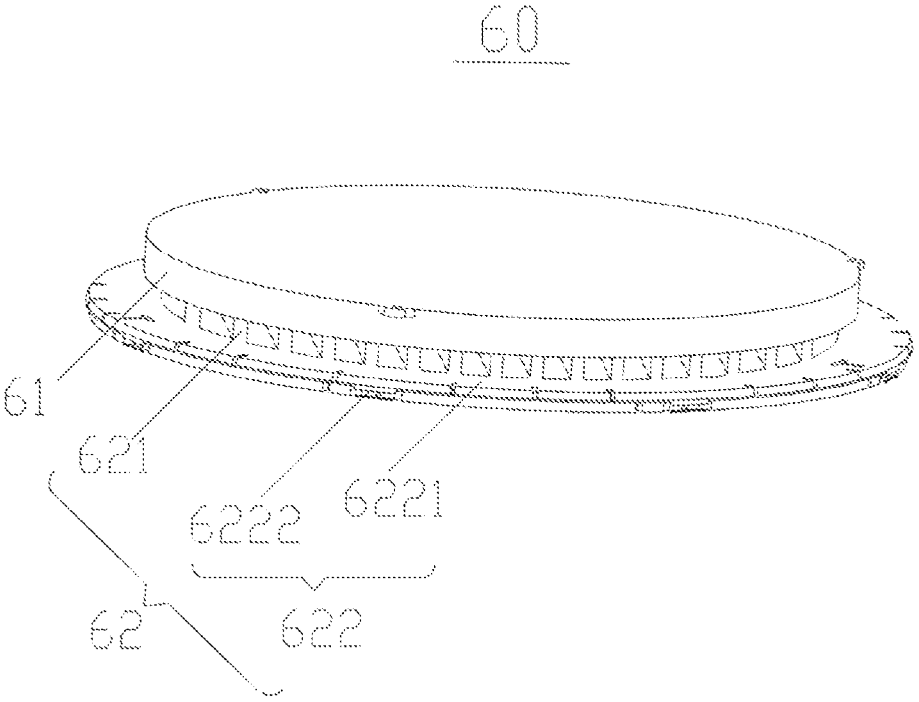
FIG. 4 shows a schematic diagram of the structure of the heat sink in the embodiment of the present invention.

Referring to FIGS. 2, 4, and 7, in one embodiment, the swimming pool lamp 100 further comprises a heat sink 60. The heat sink 60 is attached to the back of the mounting substrate 11, where several RGBIC lamp beads 12 are installed on the back. Since swimming is mostly performed in summer, the air temperature and ambient temperature in the use scenario are high, while the swimming pool lamp 100 is fixed at the bottom or wall of the pool and submerged in water. Although its housing can achieve a certain cooling effect under the action of water, its internal components cannot achieve good heat dissipation. Based on the aforementioned sealing and waterproof settings, it cannot dissipate heat by means of ventilation, etc. Therefore, the heat sink 60 is set up to dissipate heat on several RGBIC lamp beads 12 and the mounting substrate 11, in order to avoid excessive heating of internal components due to high temperature, long working time, and other reasons, which may cause damage or decrease in service life. The heat sink 60 is directly attached to the back of the mounting substrate 11 on which the lamp beads are installed, which can quickly transmit and effectively dissipate the heat generated by the lamp beads during operation, achieving the purpose of heat dissipation.

Referring to FIGS. 4 to 7, in one embodiment, the heat sink 60 comprises a heat conduction portion 61 and a fin structure 62, wherein the heat conduction portion 61 is attached to the mounting substrate 11, the fin structure 62 comprises a first heat dissipation portion 621 connected to the heat conduction portion 61 and extending away from the mounting substrate 11, and a second heat dissipation portion 622 formed by extending the first heat dissipation portion 621 away from the end of the heat conduction portion 61, the second heat dissipation portion 622 is in contact with the inner surface of the second housing 14 towards the containment space. The heat conduction portion 61 conducts the heat generated during the operation of the mounting substrate 11 and the lamp beads, and then transmits it to the second housing 14 through the first heat dissipation portion 621 and the second heat dissipation portion 622, in order to dissipate the heat to the external environment through the second housing 14. Exemplarily, the first heat dissipation portion 621 can be provided with multiple groups, and the multiple groups of first heat dissipation portion 621 is uniformly arranged on the surface of the heat conduction portion 61 away from the mounting substrate 11. The second heat dissipation portion 622 comprises a hollow annular part 6221 and an abutting part 6222; An end of the first heat dissipation portion 621 far away from the heat conduction portion 61 is connected to the inner edge of the annular part 6221, and the outer edge of the annular part 6221 is connected to the abutting part 6222. The abutting part 6222 is arranged to adapt to the shape of an inner surface of the second housing 14, so that the abutting part 6222 has a certain amount of contact area with the second housing 14. As one example, the first heat dissipation portion 621 is arranged in a thin sheet shape, the annular part 6221 is arranged as an annular thin sheet, and the abutting part 6222 is arranged as an annular thin sheet adapted to the inner surface of the second housing 14.

Optionally, the heat sink 60 is an integrated structure, and the second housing 14 can be made of a temperature resistant and thermally conductive material.

Figure 8:
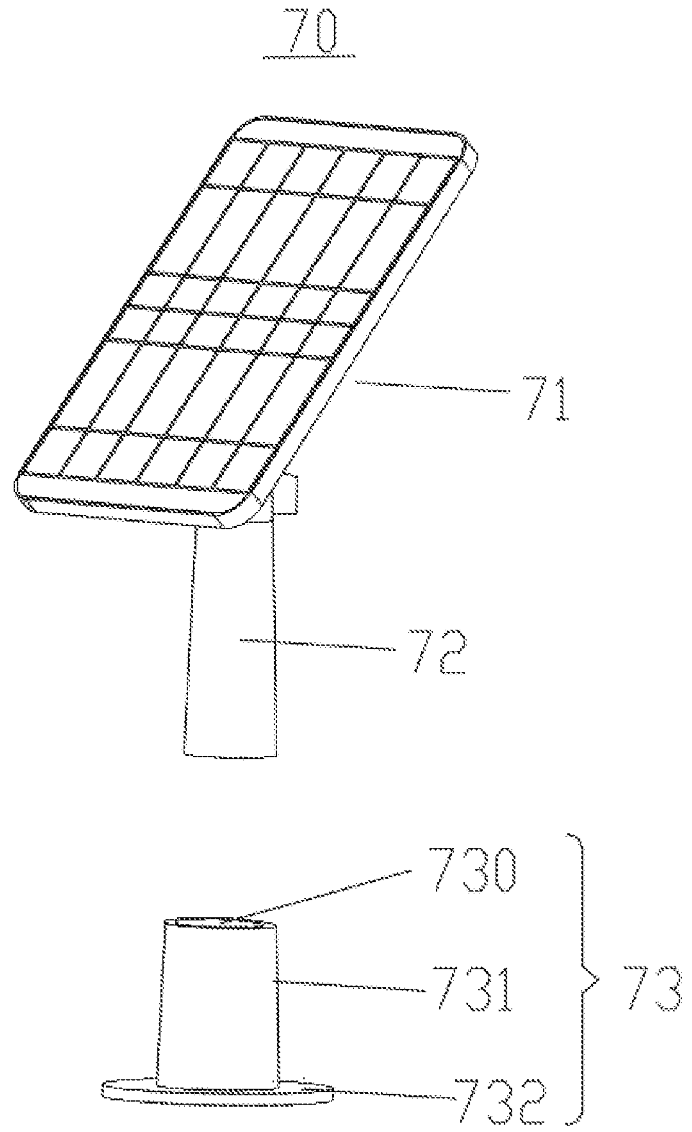
FIG. 8 shows a structural schematic diagram of a solar energy storage device in one embodiment of the present invention.
Figure 9:
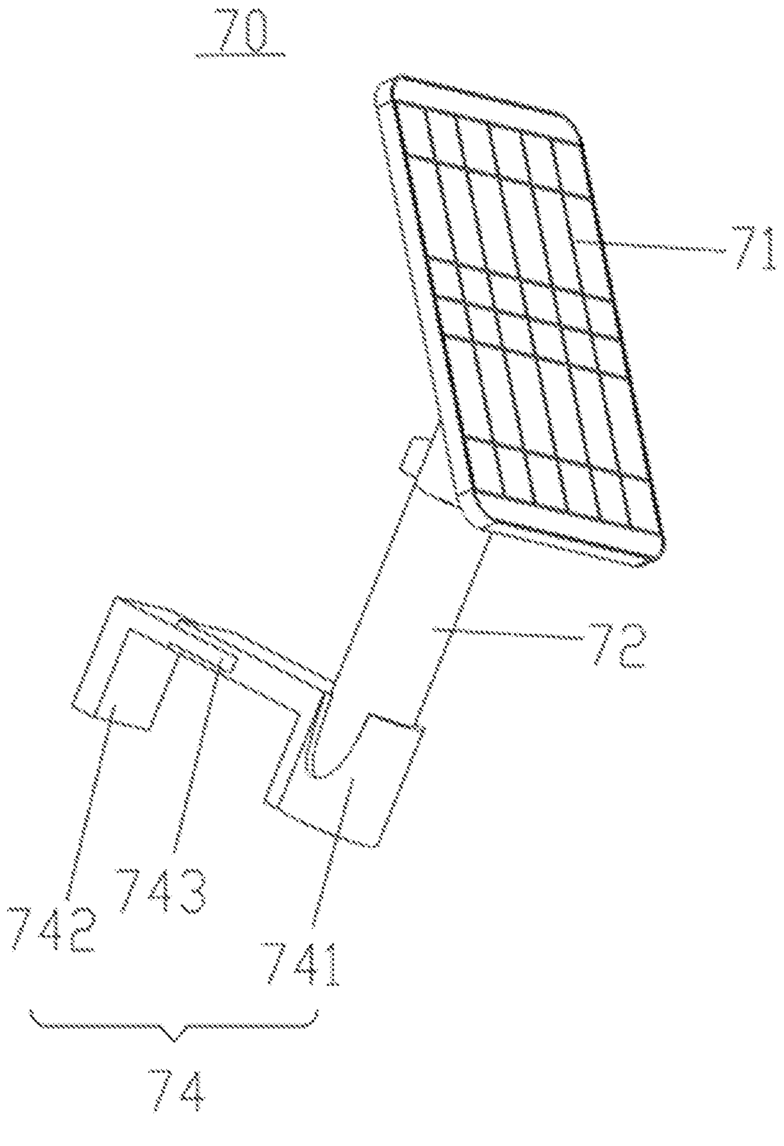
FIG. 9 shows a structural schematic diagram of a solar energy storage device in another embodiment of the present invention.

Referring to FIGS. 8 and 9, in one embodiment, the present invention further comprises a solar energy storage device 70 electrically connected to the controller 20. The solar energy storage device 70 is used to convert solar energy into electrical energy and store it to power the light-emitting lamp body 10. By setting the solar energy storage device 70, it can effectively save energy, and avoid access to external power supply, thereby avoiding such issues as limited use due to the length of the power cord 30 or the need for external power sources to be set near the swimming pool, further improving the convenience of using the swimming pool lamp 100.

Referring to FIG. 8, in one embodiment, the solar energy storage device 70 comprises a photovoltaic panel 71, an energy storage component 72 electrically connected to the photovoltaic panel 71, and a fixed base 73. The photovoltaic panel 71 is rotatably arranged at the top of the energy storage component 72, and the fixed base 73 is fixedly arranged at the bottom of the energy storage component 72; The outer circumference of the energy storage component 72 is arranged in a columnar structure, and the fixed base 73 comprises a connection portion 731 for connecting with the energy storage component 72 and a supporting chassis 732 fixedly connected to the bottom of the connection portion 731. The connection portion 731 has an accommodating cavity 730 that is suitable for the bottom of the energy storage component 72, and the energy storage component 72 can be fixed in the accommodating cavity 730 in a plug-in manner. Exemplarily, an elastic protective layer can be set on the inner wall of the accommodating cavity 730 to protect the energy storage component 72 while also increasing the connection strength. In practical use, the solar energy storage device 70 can be placed on a plane near the swimming pool through the supporting chassis 732, and the photovoltaic panel 71 can be rotated according to the angle of sunlight irradiation, so that the photovoltaic panel 71 can effectively receive sunlight and convert solar energy.

Referring to FIG. 9, in another embodiment, the solar energy storage device 70 comprises a photovoltaic panel 71, an energy storage component 72 electrically connected to the photovoltaic panel 71, and a clamping base 74. The photovoltaic panel 71 is rotatably arranged at the top of the energy storage component 72, and the clamping base 74 is fixedly arranged at the bottom of the energy storage component 72; The clamping base 74 comprises a fixing portion 741 fixedly connected to the energy storage component 72, a clamping frame 742 fixedly connected to the fixing portion 741 and forming a clamping space, and an adjusting element 743 connected to the clamping frame 742 and used for adjusting the clamping space. The fixing method of clamping base 74 can be applied to a cloth enclosed swimming pool. The photovoltaic panel 71 and energy storage module 72 are fixed on the cloth through the clamping base 74, and the orientation of the photovoltaic panel 71 is adjusted according to the angle of solar irradiation.

In summary, the swimming pool lamp provided by the present invention is connected to a controller through a light-emitting lamp body, and multiple lighting modes are switched and controlled through several RGBIC lamp beads in the light-emitting lamp body. Through a programmable driving IC, several light-emitting chips are controlled according to a preset program to combine multiple lighting effects; It requires fewer components and is small in size, effectively reducing the production and transportation costs caused by the need for multiple components to connect and work with existing swimming pool light technology, as well as reducing the space required for actual installation and use.

The above is only a specific implementation of the present invention, but the scope of protection of the present invention is not limited to this. Any skilled person familiar with the technical field within the scope of disclosure of the present invention can easily think of changes or replacements, which should be covered within the scope of protection of the present invention. For this reason, the protection scope of the present invention should be based on the protection scope of the claims.

What is claimed is:

1. A swimming pool lamp, comprises:

a light-emitting lamp body, comprising a mounting substrate and several RGBIC lamp beads installed on the mounting substrate;

a controller, one end of which is electrically connected to the light-emitting lamp body, and the other end is connected to a power supply device through a power cord to supply power to the light-emitting lamp body;

wherein, any RGBIC lamp bead comprises several light-emitting chips and a programmable driving IC electrically connected to the light-emitting chips;

a holder for fixedly connecting the light-emitting lamp body to the swimming pool;

the holder comprises a first mounting portion detachably connected to the light-emitting lamp body and a second mounting portion that is away from the first mounting portion and fixedly connected to the swimming pool; The first mounting portion can be detachably connected to the backlight side of the light-emitting lamp body, and the second mounting portion is fixed to the pool wall or bottom to fix the light-emitting lamp body to the pool wall or bottom;

the light-emitting lamp body comprises a first housing, a second housing, and a light-transmitting housing; the light-transmitting housing and the first housing are fixedly connected to the second housing, respectively, and the light-transmitting housing, the second housing and the first housing are jointly enclosed to form a space for containing the mounting substrate and several RGBIC lamp beads; the connections between the second housing and the light-transmitting housing as well as the first housing are respectively provided with a first waterproof structure and a second waterproof structure.

2. The swimming pool lamp of claim 1, characterized in that, both the first waterproof structure and the second waterproof structure comprise an annular flange protruding from the connections between the second housing and the light-transmitting housing as well as the first housing, an annular groove concaving at the light-transmitting housing and the connection between the first housing and the second housing, and an elastic waterproof member embedded between the annular flange and the annular groove.

3. The swimming pool lamp of claim 2, characterized in that, both the first waterproof structure and the second waterproof structure are provided with at least two sets, the at least two sets of first waterproof structures are arranged coaxially, and the at least two sets of second waterproof structures are arranged coaxially.

4. The swimming pool lamp of claim 1, further comprises a heat sink, which is attached to the back of the mounting substrate, where several RGBIC lamp beads are installed on the back.

5. The swimming pool lamp of claim 4, characterized in that, the heat sink comprises a heat conduction portion and a fin structure, wherein the heat conduction portion is attached to the mounting substrate, the fin structure comprises a first heat dissipation portion connected to the heat conduction portion and extending away from the mounting substrate, and a second heat dissipation portion formed by extending the first heat dissipation portion away from the end of the heat conduction portion, the second heat dissipation portion is in contact with the inner surface of the second housing towards the containment space.

6. The swimming pool lamp of claim 5, wherein:

the second heat dissipation portion comprises a hollow annular part and an abutting part;

an end of the first heat dissipation portion far away from the heat conduction portion is connected to an inner edge of the annular part, and the outer edge of the annular part is connected to the abutting part;

the abutting part is arranged to adapt to shape of the inner surface of the second housing.

7. The swimming pool lamp of claim 1, further comprises a solar energy storage device electrically connected to the controller, which is used to convert solar energy into electrical energy and store it to power the light-emitting lamp body.

8. The swimming pool lamp of claim 7, characterized in that, the solar energy storage device comprises a photovoltaic panel, an energy storage component electrically connected to the photovoltaic panel, and a fixed base; the photovoltaic panel is rotatably arranged at the top of the energy storage component, and the fixed base is fixedly arranged at the bottom of the energy storage component;

the energy storage component is arranged in a columnar structure, and the fixed base comprises a connection portion for connecting with the energy storage component and a supporting chassis fixedly connected at the bottom of the connection portion; The connection portion has an accommodating cavity that is suitable for the bottom of the energy storage component, and the energy storage component can be fixed in the accommodating cavity in a plug-in manner.

9. The swimming pool lamp of claim 7, characterized in that, the solar energy storage device comprises a photovoltaic panel, an energy storage component electrically connected to the photovoltaic panel, and a clamping base; the photovoltaic panel is rotatably arranged at the top of the energy storage component, and the clamping base is fixedly arranged at the bottom of the energy storage component; The clamping base comprises a fixing portion fixedly connected to the energy storage component, a clamping frame fixedly connected to the fixing portion and forming a clamping space, and an adjusting element connected to the clamping frame and used to adjust the size of the clamping space.

* * * * *